US012600495B2

(12) United States Patent　　　　(10) Patent No.:　　US 12,600,495 B2

Berner et al.　　　　　　　　　　　　　(45) Date of Patent:　　　Apr. 14, 2026

(54) CLEANING APPARATUS FOR ROTOR BLADES

(71) Applicant: Christian Stephan Berner, Weil am Rhein (DE)

(72) Inventors: Christian Stephan Berner, Weil am Rhein (DE); Giuseppe Maisano, Weil am Rhein (DE)

( * ) Notice: Subject to any disclaimer, the term of this patent is extended or adjusted under 35 U.S.C. 154(b) by 0 days.

(21) Appl. No.: 17/775,838

(22) PCT Filed: Sep. 28, 2020

(86) PCT No.: PCT/IB2020/059037
　　§ 371 (c)(1),
　　(2) Date: May 10, 2022

(87) PCT Pub. No.: WO2021/094847
　　PCT Pub. Date: May 20, 2021

(65) Prior Publication Data

US 2022/0388687 A1　　Dec. 8, 2022

(30) Foreign Application Priority Data

Nov. 12, 2019　(DE) ..................... 10 2019 130 536.5

(51) Int. Cl.
　B08B 1/00　　　　(2024.01)
　B08B 1/10　　　　(2024.01)
　　　　　　(Continued)

(52) U.S. Cl.
　CPC .................. B64F 5/30 (2017.01); B08B 1/10 (2024.01); B08B 1/14 (2024.01); B08B 1/30 (2024.01);
　　　　　　(Continued)

(58) Field of Classification Search
　None
　See application file for complete search history.

(56) References Cited

U.S. PATENT DOCUMENTS

2004/0250367 A1　12/2004　Fraser
2011/0035891 A1 *　2/2011　Chew ..................... A46B 13/08
　　　　　　　　　　　　　　　　　　15/97.1
　　　　　　　(Continued)

FOREIGN PATENT DOCUMENTS

CN　　　201827159　　*　5/2011
CN　　　206067718　　*　4/2017
　　　　　　(Continued)

OTHER PUBLICATIONS

Oxford English Dictionary definition of "handle".*
　　　　　　(Continued)

*Primary Examiner* — Kaj K Olsen
*Assistant Examiner* — Ryan L Coleman
(74) *Attorney, Agent, or Firm* — Biotech Beach Law PC; Raymond Wagenknecht

(57)　　　　　ABSTRACT

A device having an opening with an edge, whereby on at least one side region of this edge, at least one cleaning element is located, and a support element for limiting the rotation of the opening about a rotation axis and for absorbing compressive forces is arranged on an opposite further side region, and wherein the opening is arranged in a frame which is tiltably connected to a holder via a joint providing the axis of rotation, so that both the at least one cleaning element and the support element can be rested against the rotor blade.

11 Claims, 5 Drawing Sheets

(51) Int. Cl.

| | |
|---|---|
| *B08B 1/14* | (2024.01) |
| *B08B 1/30* | (2024.01) |
| *B08B 1/34* | (2024.01) |
| *B08B 13/00* | (2006.01) |
| *B64F 5/30* | (2017.01) |
| *B08B 1/40* | (2024.01) |

(52) U.S. Cl.
CPC ................ *B08B 1/34* (2024.01); *B08B 13/00* (2013.01); *B08B 1/143* (2024.01); *B08B 1/40* (2024.01)

(56) References Cited

U.S. PATENT DOCUMENTS

| | | | |
|---|---|---|---|
| 2014/0305217 | A1 | 10/2014 | Tapia et al. |
| 2015/0135459 | A1 | 5/2015 | Lee et al. |
| 2016/0334301 | A1 | 11/2016 | Hafenrichter et al. |
| 2020/0171552 | A1* | 6/2020 | Hamamura ............... B08B 1/00 |

FOREIGN PATENT DOCUMENTS

| | | | |
|---|---|---|---|
| CN | 206968205 | * | 2/2018 |
| CN | 207750293 | * | 8/2018 |
| CN | 208228925 | * | 12/2018 |
| DE | 3226629 | C1 | 12/1983 |
| DE | 3877086 | T2 | 12/1992 |
| DE | 1033628 | * | 2/2005 |
| DE | 102010010382 | A1 | 9/2011 |
| EP | 2727843 | A2 | 5/2014 |
| EP | 2752621 | A2 | 7/2014 |
| KR | 1020130025551 | A | 3/2013 |
| WO | 2008138135 | A1 | 11/2008 |

OTHER PUBLICATIONS

Translation of DE1033628 by Buss, published Feb. 17, 2005.*
Translation of CN206968205 by Nakamura, published Feb. 6, 2018.*
Merriam-Webster dictionary definition "cinematic".*
Translation of CN208228925 by Guo, published Dec. 14, 2018.*
Translation of CN201827159 by Chen, published May 11, 2011.*
Translation of CN207750293 by Zhang, published Aug. 21, 2018.*
Translation of CN206067718 by Huang, published Apr. 5, 2017.*
PCT/IB2020/059037 International Search Report mailed on Jan. 19, 2021.

* cited by examiner

CLEANING APPARATUS FOR ROTOR BLADES

TECHNICAL FIELD

The invention relates to the field of cleaning devices. More precisely, the invention relates to an apparatus and a method for cleaning a rotor blade of an aircraft.

BACKGROUND OF THE INVENTION

Rotor blades are used to generate propulsion of a means of transportation by interacting with a gaseous medium. A rotor blade of the type relevant here is, for example, a propeller blade of a propeller or turboprop aircraft or the rotor blade of a helicopter or rotorcraft.

Such rotor blades become dirty during operation, for example due to dust or insects that stick to the essentially smooth surface of the rotor blades and can thus lead to undesired detachment of the air flowing around the rotor blade during operation. It is therefore necessary to clean a rotor blade thoroughly on a regular basis to maintain the best possible efficiency as well as a long service life.

Until now, such cleaning has usually been done manually, i.e. a person cleans the surfaces of the rotor blade with a wet sponge, rag or similar.

With the propellers of smaller aircraft, this is still relatively easy to handle. However, it may be necessary to rotate a propeller slightly after cleaning one of its rotor blades so that the person cleaning it can reach the next rotor blade of the propeller. Under certain circumstances, rotating is only possible with a great deal of force, since the propeller is usually directly connected to the engine and cannot be decoupled. Improper contact with the propeller can result in damage to the propeller or even injury to the person cleaning it.

Cleaning the rotor blades of e.g. a helicopter is more problematic. In order for a person cleaning these rotor blades to be able to reach a rotor blade, this person usually needs a platform or a stepladder. The construction of a platform is relatively complex. On the other hand, with a stepladder, the rotor blade can only be cleaned over a relatively short section. The cleaning person must then descend from their stepladder, move the stepladder, and then climb back onto the stepladder before cleaning the next short section.

Of course, this is also very laborious and time-consuming. In addition, it is very strenuous for a person performing the cleaning to repeatedly climb up and down a ladder, move the ladder and, if necessary, also move the cleaning utensils each time.

Another problem with the purely manual cleaning of a rotor blade is the different cleaning results depending on the person cleaning the blade. Since each person has different strength, different experience in cleaning, and a different understanding of the cleaning result to be achieved, the cleaning results of different persons can differ significantly. This is undesirable in terms of a reproducible cleaning result.

Document DE 38 77 086 T2 discloses an apparatus with which the surface of a wing can be cleaned in a semi-automated manner, in that the apparatus comprises a lifting carriage on which a large rotating roller, comparable to that of a car wash, is arranged. Thus, such an apparatus does reduce the dependence of the cleaning result and relieves the user to a certain extent. However, the apparatus is only suitable for cleaning the underside of the wing; moreover, it is very complex in design.

The publication US 2016/0 334 301 A1 also originates from the same field as the present application and relates to an apparatus for cleaning a rotor blade of an aircraft. This apparatus is placed on the rotor blade and comprises means for automatic movement along the rotor blade, as well as at least one cleaning element which is also movable and can move automatically around the rotor blade. Due to the high degree of automation, however, the apparatus has a relatively complex design and requires a corresponding control system, as well as a power supply.

SUMMARY OF THE INVENTION

Accordingly, the invention is based on the object of providing an apparatus and a method which avoids the disadvantages of the prior art.

It is therefore an object of the present invention to provide an apparatus which facilitates the above described laborious work while being safe in operation.

A further object of the invention is to provide an apparatus with which a good cleaning result can be achieved that is as independent as possible of the respective user.

In one aspect of the invention, an apparatus for cleaning a rotor blade of an aircraft is provided, characterized in that the apparatus has an opening for passing through the rotor blade, having an edge, whereby on at least one side region of this edge, at least one cleaning element is located, and on a further side region opposite this side region of the edge, a support element is located to limit the rotation of the opening around an axis of rotation, and for absorbing compressive forces, and wherein the opening is arranged in a frame, being tiltably connected to a holder via a joint that provides the axis of rotation, so that by rotating the frame around the axis of rotation both the at least one cleaning element as well as the support element can rest against the rotor blade, while forces holding the frame in position on the rotor blade by using the holder are provided.

In some embodiments, the joint is arranged for the transmission of torques. In some embodiments, for the transmission of torques the joint (8) comprises a compression, tension or torsion spring, or is designed as an elastic element, or a compression, tension or torsion spring is arranged between the frame (1) and holder (9), contains at least one end stop, which prevents further tilting.

In some embodiments, the cleaning element is designed as a cleaning roller. In some embodiments, the cleaning roller being mounted on the frame by means of a freewheel which is locking in a rotation direction, and/or being driven by a drive unit.

In some embodiments, the cleaning element is designed as a cleaning sponge. In some embodiments, at least a section of the frame's side region being equipped with the cleaning sponge is resiliently movable into the opening through which the rotor blade is passed, and/or wherein the section includes pivot bearings on which the cleaning sponge and/or the cleaning sponge comprises a gel pad.

In some embodiments, the cleaning element is designed as a gel pad. In some embodiments, the cleaning element is supplied via a liquid supply with a cleaning liquid.

In some embodiments, the distance between the two side regions can be controlled by means of a cinematics that can be activated by tilting the holder.

In some embodiments, having two cleaning rollers or with one cleaning roller and a roller-shaped support element, characterized in that at a distal end of the holder (9) a support unit (28) is provided for low-friction mounting of this end on the rotor blade (5), or in that the holder (9) is provided at a distal end for manual operation by the user, wherein the cleaning rollers or the one cleaning roller and the roller-shaped support element can be driven by means a drive unit and/or are constructed in a way such that the device can be moved in a preferred direction by them.

A method for cleaning a rotor blade of an aircraft is also provided, characterized in that the rotor blade is passed through an opening arranged in a frame which has an edge, wherein at least one cleaning element is present on at least one side region of this edge; by tilting the frame by means of a holder which is arranged on the frame by means of a joint, the at least one cleaning element is rested against one side of the rotor blade, until the tilting of the frame is limited by means of a support element arranged on a frame's further side region opposite to said side region, in that said support element rests against an opposite side of the rotor blade, also absorbing compressive forces, whereby the angle between the holder and the frame is reduced by tilting the holder about an axis of rotation provided by the joint so that pressure forces are exerted on the at least one cleaning element as well as the support element, which press these components against the sides of the rotor blade, while by means of the holder forces are continuously provided which hold the frame in position on the rotor blade.

In some embodiments, the joint also transmits a torque which supports the resting of the at least one cleaning element as well as the support element against the opposite sides of the rotor blade.

In some embodiments, a support unit, which is arranged at a distal end of the holder, is supported with low friction on the rotor blade, while roller-shaped cleaning elements or a roller-shaped cleaning element and a roller-shaped supporting element are arranged at the side regions, which are driven to different circumferential speeds by means of a drive unit.

BRIEF DESCRIPTION OF THE DRAWINGS

The invention is explained below by way of example with the aid of figures. Thereby shows FIG. 1 the schematic sketch of a rotor blade cleaning apparatus in front view.

DETAILED DESCRIPTION

Figures 1, 2:
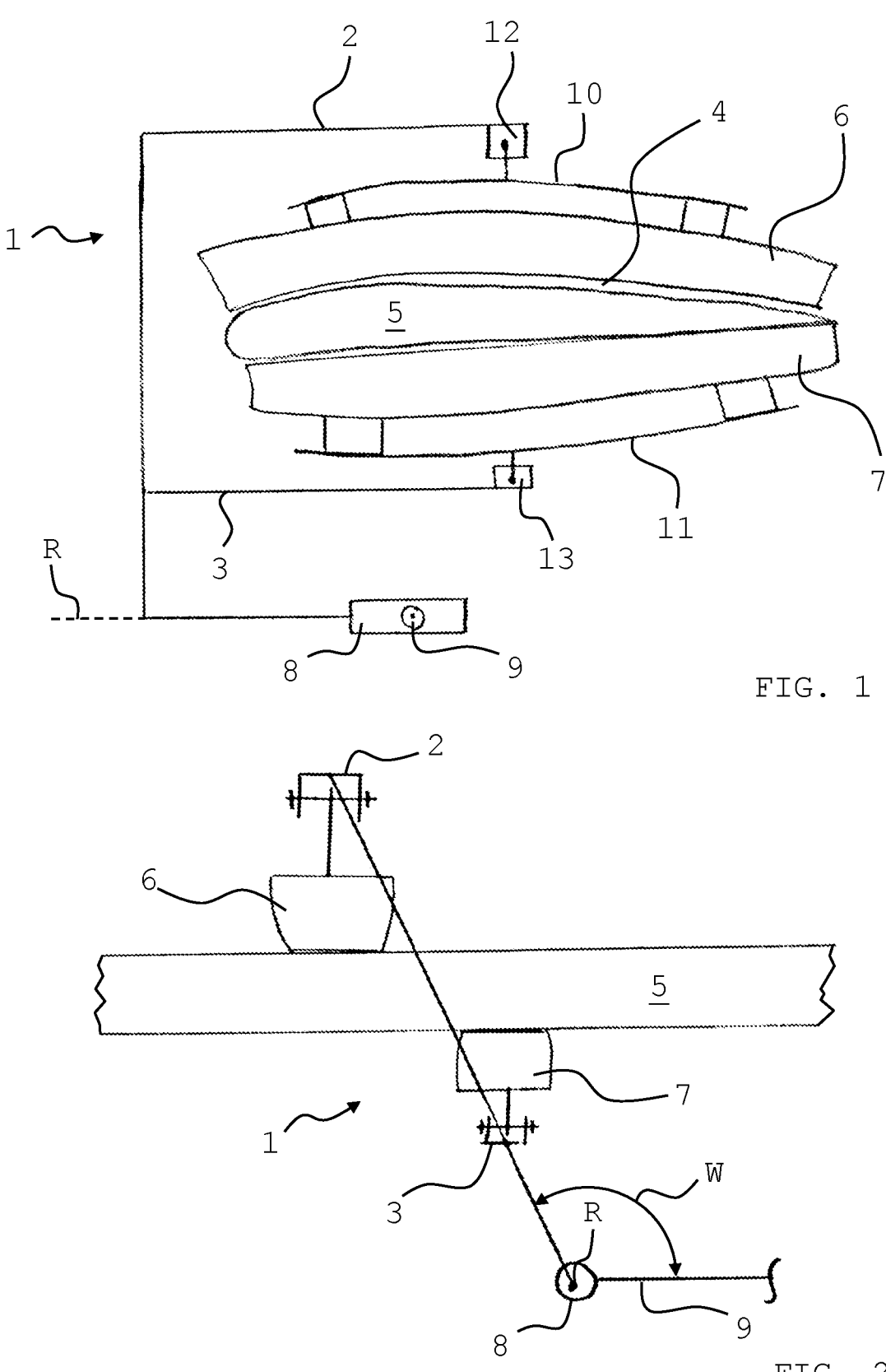
FIG. 2 the schematic sketch of the rotor blade cleaning apparatus according to FIG. 1 in side view.

First, the apparatus according to the invention is described. Subsequently, the method according to the invention is described.

The object is solved by an apparatus for cleaning a rotor blade of an aircraft, which has an opening for passing through the rotor blade. The opening can be circumferentially closed, but preferably open on one side, similar to a "U".

The opening has an (internal) edge, whereby on at least one side region of this edge, at least one cleaning element is located. The (mechanical, achieved by relative movement, where appropriate supported by liquid) cleaning of the rotor blade takes place by means of this cleaning element, which is to be described in more detail below. By definition, the term "cleaning" also includes polishing the desired surface; thus, an apparatus according to all embodiments is also suitable for polishing or treating the surface of a rotor blade in some other way.

On a further side region opposite this side region of the edge, further, a support element is located to limit the rotation of the opening around an axis of rotation and for absorbing compressive forces. The object of this support element is therefore to prevent an otherwise uncontrolled rotating movement of the opening, in which said rotation is prevented by resting the support element against the rotor blade (more precisely: to the opposite side of the same).

The opening is arranged in a frame. This means that the frame is constructed in such a way that it provides the circumferentially closed or unilaterally open opening. It may consist of several components (e.g., bolted, welded, glued, or joined struts or rods), or it may be of one-piece construction (e.g., multiple bent tube). A light but sufficiently stable (torsion resistant) construction is preferred.

According to the invention, the frame is tiltably connected to a holder via a joint providing the axis of rotation. The term "joint" is to be understood broadly in this context and not limited to "rotary joints" (hinges, shaft bearings, etc.). It is only essential that the two components attached to the joint (frame on the one hand, holder on the other) are not completely rigidly connected to each other, but can be tilted relative to each other about at least (and preferably exactly) one axis of rotation. Accordingly, the term "tiltably" is, for the time being, not to be understood as limited to one direction of rotation; nevertheless, a joint that provides exactly one axis of rotation is preferred.

By means of rotation or tilting of the frame around the axis of rotation, both the at least one cleaning element and the support element can be rested against the rotor blade; which means that—after an initial sliding of the frame providing the opening onto the rotor blade—the frame firstly rotates about said axis of rotation, the same being approximately in the normal plane of the rotor blade, which is perpendicular to the longitudinal axis. Preferably, it is normal to the longitudinal axis and perpendicular to the surface normal of the rotor blade. The rotation comes to a standstill when both the cleaning element and the support element are in contact with (opposite) sides of the rotor blade. Only in this position a reliable mechanical contact is established between the apparatus and the rotor blade, so that cleaning is possible.

At the same time, forces holding the frame in position on the rotor blade by using the holder can be provided. This means that the support has the object of providing a counter-bearing that can absorb the forces generated by the rotation and the abutment, so that the apparatus can be held at a certain position, or guided along a certain path.

The invention thus avoids the disadvantages known from the prior art.

The invention allows convenient cleaning of a rotor blade under manual guidance by means of the holder, as the user, assuming an appropriate length of the holder, no longer has to climb a ladder or other elevation to clean the rotor blade section by section. Accordingly, the apparatus is also safe to operate, as the risk of an accident is significantly reduced.

In addition, the invention makes it possible to achieve a good cleaning result that is largely independent of the respective user, since the apparatus can exert cleaning pressures on the rotor blade that can be predetermined by design (and are thus independent of the user). Due to the possibility of continuous cleaning of a rotor blade along its entire length, the existence of overlaps (or even gaps) between the cleaned individual sections, which otherwise vary in position and intensity depending on the user, is also eliminated.

Subsequently, different embodiments of the invention are described in detail.

According to a preferred embodiment, the apparatus comprises two cleaning elements. This means that also the support element is designed as a cleaning element. The advantage of an apparatus comprising two cleaning elements is that the rotor blade can be cleaned on both sides at the same time. Consequently, such an apparatus saves considerable time in cleaning the same.

The cleaning elements can be of the same or of different design (for design types see below).

Each cleaning element can also be designed in multi-part. This means that it can comprise sub-assemblies which, however, act as a unit.

The holder can be designed as a longer handle, which is optionally adjustable in length, for example telescopic. In principle, however, a working boom of a robot is also suitable as a holder.

According to one embodiment, the joint may be arranged, as seen in a side view, in the region of the extension of the central region of the frame connecting the two side regions. The distance to the nearer side region can be a few centimeters to a meter or more.

According to another embodiment, the joint is located in the central region of the frame, i.e. the region between the two side regions. The axis of rotation is then also located between the side regions and thus inside the opening.

In a front view, i.e. looking in the direction of the longitudinal axis of the rotor blade, it is advantageous if the joint when being in working position is arranged approximately centrally between the edges of the rotor blade. In particular, an arrangement such that the apparatus is balanced and does not tend to tilt toward either edge is preferred. If necessary, the position between the two edges can also be adjustable, or the balance can be adjusted by means of a sliding or variable weight.

According to another preferred embodiment, the joint is arranged to transmit torque. This means that the joint (or an apparatus associated with it) can transmit forces introduced via the holder that cause a rotation of the rest of the apparatus. The advantage of such a design is the significantly improved support in achieving the above-mentioned contact of the cleaning element(s) with the rotor blade. For example, it is possible that the joint is set up to strive to align the holder and frame with each other (rest position). When a user tilts the holder, enabled by the joint, relative to the frame, the compressive forces exerted by the cleaning element(s) on the rotor blade increase as the force applied to tilt is propagated through the joint. It is clear that this rest position, given by preload of the joint, can also be adjusted to another angle, for example to 90 degrees, 45 degrees, 30 degrees, or 120 degrees.

Preferably, the joint is preloaded via a spring or via a weight. This enables the frame to be swung back and relieved of load when the holder is moved accordingly, and the apparatus can thus be lifted off and removed from the rotor blade to be cleaned easily and without resistance.

The term "spring" is broadly defined and includes all apparatuses which serve to store and release potential energy ("tension energy"). Such devices may be made of or include hard materials (e.g. spring steel), or elastic materials (e.g. rubber).

To transmit torque, the joint may include a compression, tension, or torsion spring.

The joint can also be designed as an elastic element, for example as a simple rod, which serves as a link between the holder and the frame, so that tilting is possible and at the same time the desired restoring forces are present.

According to a further embodiment, a compression, tension or torsion spring is arranged between the frame and the holder. This means that the apparatus for storing and releasing potential energy is not arranged in or directly on the joint, but is located outside of it; nevertheless, the unit of joint and apparatus allows the desired transmission of torques.

Depending on the design of the spring, the transmissibility of the torque increases to a greater or lesser extent as the tilt angle increases. This means that it is possible to be able to transmit almost no torque in an initial position, wherein this also increases with increasing tilt.

According to another embodiment, the joint comprises at least one mechanical stop which prevents further relative tilting between the holder and the frame when a locking position is reached. This means that before reaching the stop, free tilting (without transmission of torque) is possible, but when the locking position is reached, the full torque can be transmitted (rigid joint). The stop can be on one or both sides; the latter means that two locking positions exist between which free tilting is available (spring with one or two stops).

It is also possible to combine the aforementioned variants with each other (spring with one or two end stops).

According to a further embodiment, the torque is transmitted by motor. This means that a motor or drive is present in or at the joint, which applies a torque to the frame, provided that the holder receives appropriate support. The advantage of such an embodiment lies in particular in the controllability of the torque by means of controllability of the motor.

Likewise, any other apparatus is conceivable by means of which the strength of the transmissible or transmitted torque can be adjusted (e.g. adjustment of the spring hardness, adjustment of a corresponding stop, change of the preload).

According to one embodiment, the cleaning element is designed as a cleaning roller (hereinafter also referred to as "roller" for short). The surface of the cleaning roller can be sponge-like, brush-like or gel-pad-like. Such a roller has the advantage that it has a larger (circumferential) surface area than a flat, non-rotatable cleaning element, which increases its dirt-holding capacity.

Such a roller can also be adapted to the contour of the blade to be cleaned. In particular, when a gel pad is present, the possibility exists that the surface can be optimally adapted to the contour of the rotor blade (which usually varies along its length) due to the distribution possibility of the gel, resulting in a uniform force distribution and thus cleaning performance.

It is optionally possible that the roll is (additionally) provided with a terry cloth, fur or microfiber cover. It is further possible that the roll is equipped with an absorbent, contoured sponge and/or, as mentioned, with a gel pad.

The roller can also be constructed as a multi-part roller unit. This means that two or more rollers are arranged on one shaft, and/or one behind the other on parallel shafts. The shafts are connected to each other via a frame, and the frame is in turn connected to the side leg of the frame.

According to a further embodiment, the cleaning roller is mounted on the frame via a freewheel that locks in one direction of rotation. This allows the roller to run along the surface of the rotor blade to be cleaned during a movement in a first direction, in which the freewheel releases the rotation of the cleaning roller, and to moisten this surface if necessary, so that adhering dirt is possibly already soaked. In contrast, when the cleaning roller moves in the opposite direction and the freewheel stops the rotation of the cleaning roller, the cleaning roller is pulled over the surface of the rotor blade to be cleaned in a non-rolling but rubbing manner, thus removing any dirt adhering to it.

According to a further embodiment, the cleaning roller is elastically mounted in order to adapt to different rotor blade geometries and, in particular, blade thicknesses. The corresponding suspension of the cleaning roller can be achieved, for example, by unilaterally supporting it on a swivel joint which is pretensioned by a spring or elastomeric element. The force exerted on the sides of the rotor blade can be adjusted by setting the hardness of the pressure spring.

According to another embodiment that can be combined with both of the above embodiments, the cleaning roller is driven by a motor or drive unit. In this way, the cleaning effect can be increased even further; persistent contaminants in particular can thus be cleaned without the user having to move the apparatus back and forth manually. The direction of movement of the roller can optionally be switched manually or automatically.

According to another embodiment, the cleaning element is designed as a cleaning sponge. Such cleaning sponges are sufficiently elastic to be able to adapt to a curved rotor surface. In addition, they can easily be provided with a cleaning liquid and also have good dirt holding capacity.

If necessary, a corresponding cleaning sponge can also be provided with a microfiber cover. This improves the cleaning power and dirt absorption of the cleaning element accordingly.

Like the roller described above, the sponge can also be constructed in several parts. Several sponges can be arranged next to and/or behind each other, and combined by means of a rack, which in turn is then attached to the frame.

According to one embodiment, at least one section of the side region of the frame provided with the cleaning sponge is resiliently movable into the opening through which the rotor blade is passed. In the case of cleaning sponges, spring elements such as leaf springs or spring-supported support sections are particularly suitable for supporting this section.

This allows the cleaning element to be closely adapted to the surface to be cleaned, so that a uniform contact pressure can be achieved across the width of the surface to be cleaned. As already mentioned, it must be taken into account that the surface to be cleaned is curved in the case of rotor blades and that this curvature can also change over the length of a rotor blade.

According to a further embodiment combinable with the foregoing embodiment, the foregoing section includes pivot bearings on which the cleaning sponge is arranged. However, tests have surprisingly shown that with the provision of such pivot bearings, other resilient support can be dispensed with, since cleaning sponges typically have sufficient flexibility on their own to allow the desired adaptability to the profile of the rotor blade.

According to a further embodiment, the cleaning sponge comprises a gel pad. This also enables optimized adaptability to the profile of the rotor blade.

According to a further embodiment, a (substantially flat) gel pad is provided as a cleaning element. This is particularly preferably covered with a microfiber cloth or another absorbent, replaceable aid.

As far as reasonable and constructively possible, the aforementioned embodiments can also be combined with each other; this applies to different sides of the apparatus as well as to the same side. For example, it may be desirable to have on one side both a sponge and a gel pad arranged next to it, or an e.g. interruptedly designed roller, whereby the resulting intermediate space can be cleaned by a sponge.

According to a further embodiment, the cleaning element is supplied with a cleaning liquid via a liquid supply.

This liquid supply preferably takes place through the holder, thus enabling a compact design. Said cleaning liquid can then be delivered onto or into the cleaning element, e.g. via nozzles or drip openings on a moistening hose or tube. This can ensure sufficient moistening of the cleaning element and the surface to be cleaned, and thus a sufficient cleaning effect, without having to remove the apparatus several times from a rotor blade to be cleaned and moisten it separately.

Preferably, liquid is also dispensed onto the other cleaning elements, if any are present In a further embodiment, which is particularly preferably combinable with the embodiment described above, the cleaning element is designed as a cleaning roller and is driven by a hydraulic motor. The cleaning fluid serves—in particular before it is applied to the cleaning element—as the drive fluid for this rotary drive of the cleaning roller.

In other alternative embodiments—especially those without cleaning fluid—the cleaning rollers are driven by an electric motor or a pneumatic motor instead of said hydraulic motor.

According to a further embodiment of the apparatus, the distance between the two side regions can be influenced by means of kinematics that can be activated by tilting the holder.

The changeability of the distance has the advantage that rotor blades with even more different thicknesses can be cleaned safely with the apparatus, and that—with thinner rotor blades—the rotation of the frame must take place less far in order to bring both side regions with the cleaning elements into contact with the rotor blade. The reason is that with a smaller distance, the abutting by successive rotation takes place earlier than with a larger distance; the plane spanned by the frame runs more perpendicularly to the longitudinal axis of the rotor blade, or the rotation, which typically starts in a perpendicular orientation, comes to a stop more quickly. This also allows faster preparation of the actual cleaning process.

The kinematics can be provided, for example, by a gear wheel arranged at the end of the holder, which interacts with a gear rack arranged on the center leg of the frame. The gear wheel is also fixed to the joint. If the tilt angle changes, the gear wheel pulls the gear rack in the corresponding direction so that the center leg shortens, reducing the distance between the two side regions.

Another example of kinematics uses a cam located at the proximal end of the holder. By rotating it, the cam pushes more or less far on a catch, which in turn is arranged on the middle leg, pushing the same together. To allow an opposite (resetting) movement in a simple way, the catch can work against a spring.

Another example includes a rope section having one end wrapped around a pivot, which in turn is collinear with the axis of rotation of the joint at the proximal end of the holder. As the holder rotates about the axis of rotation, the rope section winds or unwinds. With its other end, the rope section is attached to the spring-assisted catch in such a way that the latter brings the two side legs closer together when shortening (winding up), and moves them apart from each other when lengthening (unwinding).

Of course, other measures with the same effect are also conceivable, which result in a change in the distance between the two side regions.

The above-mentioned gearwheel or cam kinematics can also be activated by a cable pull or the like arranged in the region of the holder. In this case, it is possible to activate the kinematics without the described tilting.

The activation can also be motor-driven; the associated switch is then preferably to be arranged in the region of the distal end of the holder. It is also conceivable that sensors (pressure sensors, optical distance-measuring sensors, . . . ) are present at a suitable point in the region of the frame which automatically regulate said approach, i.e. that the frame initially has the largest possible opening which then successively decreases until the two side legs are positioned sufficiently close to the rotor blade.

A further embodiment concerns a (semi-)automatic apparatus. Accordingly, this has two cleaning rollers, or a cleaning roller and a roller-shaped support element. At a distal end of the holder, which is then not primarily intended to be held by hand, a "support unit" (not to be confused with the "support element" mentioned further above) is provided for low-friction mounting of this end on the rotor blade. "Low friction" means that when this end slides along the rotor blade, no damage to the same may occur. The end may be provided with a sliding surface, or with one or more rollers. Optionally, depending on the specific embodiment thereof, the support unit may also have an additional or supplementary cleaning effect on the rotor blade.

Furthermore, the cleaning roller and the support element can be driven by means of a drive unit and/or are designed in such a way that the apparatus can be moved with them in a preferred direction.

The drive unit can, for example, comprise two motors which each drive one roller, or it comprises a gearbox which transmits the rotation of the motor to both rollers. With essentially identical rollers, different circumferential speeds can thus be achieved at the roller/rotor blade contact surface. To achieve different circumferential speeds, the rollers can also have different diameters, or the gearbox can perform this task in a known manner. If two motors are present, they can operate at different speeds.

However, the rollers can also be otherwise designed to produce the desired effect of moving the apparatus in a particular direction. In particular, by varying the coefficient of sliding friction between the roller and the rotor blade, otherwise (geometrically) essentially identical rollers, at the same circumferential speed, can lead to different resulting propulsive forces in each case, the sum of which determines the direction and speed of the apparatus.

The resulting force can also be varied by varying the roller surface. However, it must be ensured that the entire width of the rotor blade is still cleaned. If necessary, multi-part rollers should be provided here (see above).

The advantage of this embodiment is that the apparatus can move automatically along the rotor blade. Due to the different circumferential speeds, there is a relative speed between the roller resting against the upper and lower side of the rotor blade, which leads to a linear movement of the apparatus. The holder with support unit, together with the joint, provides the appropriate guidance and pretension of the frame.

The apparatus can be activated and/or deactivated by means of a remote control, or it comprises a sensor which detects the reaching of a stop position (proximal or distal end of a rotor blade), so that neither the apparatus damages the aircraft nor is damaged itself (for example by falling down).

The advantage of such an embodiment is that the cleaning result becomes completely independent of the user, since the user is only responsible for the initial placement of the apparatus on the rotor blade and the start of the cleaning process. Highly reproducible cleaning results are therefore achievable.

Also according to another embodiment, in which the holder is provided at a distal end for manual guidance by the user, the apparatus may comprise said motorization. Optionally, the rollers may have equal or different peripheral speeds. At equal circumferential speeds, propulsion is provided by the user. At different circumferential speeds, the user holds the apparatus, which, however, moves substantially automatically along the rotor blade. The user can start, stop, regulate, and optionally reverse the rotation by means of a switch located at the distal end of the holder. It is clear that the resulting preferred direction of the frame with the rollers can also be achieved in other ways as described above.

The advantage of this embodiment lies in the improved cleaning result, as the rotating rollers ensure better dirt removal. In addition, the user may be largely relieved of the task of actively moving the apparatus.

Now follows the description of the method according to the invention for cleaning a rotor blade of an aircraft. Preferably, the method is carried out using the apparatus according to the invention as described above.

(a) First, the rotor blade is passed through an opening arranged in a frame and having an edge (facing the rotor blade), at least one cleaning element being present on at least one side region of this edge. Thus, the apparatus is positioned on the rotor blade in such a way that the latter is located in the opening of the apparatus.

(b) Then, by tilting the frame by means of a holder arranged on the frame by means of a joint, the at least one cleaning element is rested to one side of the rotor blade. Holding the holder in his hand, the user moves the holder in such a way (typically with the distal end of the holder facing upwards) that (in the example of a horizontally oriented rotor blade) the frame connected to the holder is moved from an initially rather "upright" position, in which the frame can be brought onto the rotor blade particularly easily, to a more "lying" position (tilting of the entire apparatus), in which the side regions are closer to the rotor blade. Thus, the two side regions of the frame come closer and closer to the sides of the rotor blade until one of them (or the cleaning or support element arranged on it, see below) comes into direct contact with the rotor blade.

(c) Finally, further tilting of the frame is limited by means of a support element arranged at a further side region of the edge opposite to the side region, in that said support element abuts against an opposite side of the rotor blade, while also absorbing compressive forces. In other words, further tilting of the apparatus (and thus also of the frame) eventually brings the other cleaning or support element into contact with the opposite side of the rotor blade. Further tilting of the frame is then no longer possible, since both side legs of the same cannot move further in the direction of the rotor blade.

(d) It is still possible, on the other hand, for the holder to tilt, since it is "tiltably" (rotatably) connected to the frame by means of the joint. This means that the frame can be rotated or tilted about the joint, i.e. the orientation of the holder and frame can be changed so that the angle between the two components changes, and in particular becomes smaller.

By means of a tilting of the holder around a rotation axis given by the joint, the angle between the holder and the frame is now reduced, so that compressive forces are exerted on both the at least one cleaning element and the support element, which press these components against the sides of the rotor blade. These compressive forces are relevant in that only by exerting certain frictional forces between the cleaning element and the surface to be cleaned can dirt be removed. The higher the compressive forces, the stronger the friction and the higher the cleaning effect. However, it should be noted that excessively high compressive forces can damage the apparatus and/or the surface to be cleaned. Accordingly, it is particularly advantageous if the compressive forces lie within a definable range which, if possible, is not exceeded. This is also possible with the apparatus according to the invention, as will be shown below.

(e) Furthermore, by using the holder, forces holding the frame in position on the rotor blade are provided. In other words, the user holds the apparatus in such a way that a certain tilt angle is present, so that cleaning compressive forces are applied to the rotor blade sides. He can—depending on the embodiment—manually move the apparatus back and forth so that the rotor blade can be cleaned thoroughly accordingly.

According to a particularly preferred embodiment, a torque is also transmitted by means of the joint. This torque supports the abutment of the at least one cleaning element and the support element on the opposite sides of the rotor blade. Increasing the above-mentioned tilt angle between the support and the frame now generates a torque around the joint, which leads to increased abutment of the two side regions of the frame. By changing the angle, the compressive forces can be varied (a smaller angle leads to higher compressive forces). If the torque is now transmitted from the holder to the frame via a spring that is not too hard (e.g. torsion spring), changing the horizontal positioning of the holder leads only to a slight change in the compressive forces; the cleaning result is then largely independent of the holding height by different users, for example.

If, on the other hand, the holding height is largely constant, the compressive forces can also be adjusted by setting the hardness of the spring. In this way, too, a largely uniform cleaning effect is achieved which is independent of the user, since this is determined by the hardness of the spring. Provided the holder is held in a defined position, for example horizontally, the pressure forces are only determined by the hardness of the spring.

It is also possible to design the apparatus as a largely automatically-acting apparatus. In this case, a support unit, which is arranged at a distal end of the holder, is supported on the rotor blade with low friction, while roller-shaped cleaning elements, or a roller-shaped cleaning element and a roller-shaped support element, are arranged at the side regions, which are driven to different circumferential speeds by means of a drive unit.

The support unit here takes on the task that was performed by the user in the previous embodiments, namely providing a "holding force" with which the apparatus is held in position. In this case, too, there is a joint which is arranged between the holder and the frame; preferably this also transmits a torque.

The two rollers (preferably both are cleaning elements) are driven and have a different circumferential speed; to avoid repetition, reference is made to the explanations above for the appropriately designed apparatus.

As a result, an apparatus designed in this way can move automatically along the rotor blade. Particularly preferably, the drive direction and thus the direction of movement can be reversed, so that it is possible, for example, for the user to start the apparatus at the distal end of a rotor blade and switch it on, whereupon it moves automatically to the proximal end, the reaching of which it detects, whereupon the drive direction is reversed, so that the apparatus finally moves back to the user, who then switches it off.

Preferred Embodiments

FIG. 1 shows the schematic diagram of a rotor blade cleaning apparatus in a front view. A substantially U-shaped frame 1 can be seen, in which there is an opening 4 between two side legs 2, 3, through which a rotor blade 5 to be cleaned protrudes. The side legs 2, 3 are therefore located on the two side regions of the frame 1.

In the example shown here, cleaning elements in the form of cleaning sponges 6, 7 are attached to the side legs 2 and 3, respectively, which form the edge of the opening 4 in the side region thereof.

In the example shown here, the opening 4 is provided with corresponding cleaning sponges 6 and 7, respectively, in two oppositely positioned side regions. According to an embodiment not shown, however, it is also possible if only one of these two side regions is occupied by a corresponding cleaning element and the other, opposite side region of the edge is provided for example with a support element (support rollers, not shown).

Furthermore, it is possible that, according to an embodiment not shown, not only the side regions of the edge of the opening 4 are provided with corresponding cleaning elements, but also the front surface of the opening 4 is provided with a corresponding cleaning element. Particularly preferably, all regions are then designed to be connected, so that at least the leading edge of the rotor blade 5 can be cleaned as well.

The frame 1 shown in FIG. 1 is connected via a joint 8 to a holder 9, which can be seen in particular in FIG. 2. In FIG. 2, as in all other figures, identical elements are provided with identical reference signs.

The holder 9 is a handle, shown here only sectionwise, which (also not shown) can also be telescopic if required.

When the handle, which is designed as a holder 9, is moved parallel to the longitudinal axis of the rotor blade 5 (to the right in the example shown here), the frame 1 tilts (counterclockwise in the example shown here) about the joint 8 so that the cleaning sponge 6 on the upper side of the rotor blade 5 is pressed against its surface. At the same time, on the underside of the rotor blade 5, the cleaning sponge 7 is also pressed against the surface of the rotor blade 5. Continuing the movement of the handle (further to the right), the cleaning sponges 6, 7 are then moved along the mentioned surfaces and can clean them.

It should also be mentioned that preferably the joint 8 is preloaded by a spring or by a weight (not shown here). This ensures that the frame 1 is not swiveled back when the holder 9 is moved accordingly (to the left in the example shown here), but that the two cleaning elements continue to rest securely on the rotor blade 5.

In order for the cleaning sponges 6, 7 to closely adapt to the typically curved surfaces of the rotor blade 5 during the above-mentioned cleaning process, the cleaning sponges 6, 7 in the present example are attached to the side legs 2, 3 of the frame 1 via flat spring elements 10, 11 with interposition of pivot bearings 12, 13.

Figures 3, 4:
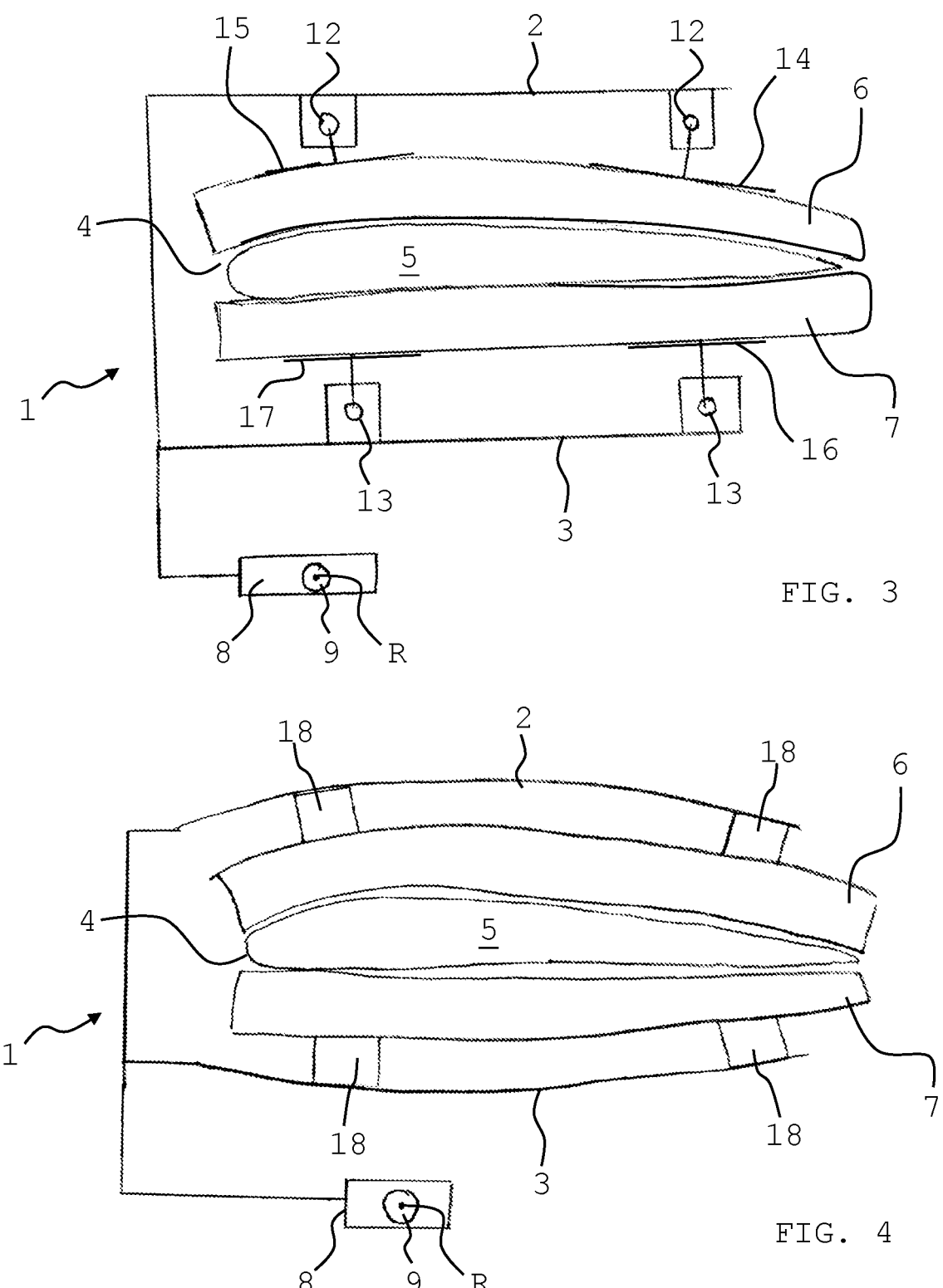
FIG. 3 the schematic sketch of an alternative embodiment of a rotor blade cleaning apparatus in front view.
FIG. 4 the schematic sketch of a further alternative embodiment of a rotor blade cleaning apparatus in front view.

FIG. 3 and FIG. 4 show alternative embodiments. Thus, it can be seen in FIG. 3 that the cleaning sponges 6, 7 shown there are coupled to the side legs 2 and 3 via support sections 14, 15, 16, 17 supporting them sectionwise, with pivot bearings 12 and 13 interposed. This is functioning because the cleaning sponges 6, 7 are typically stretchable and bendable in their extension.

FIG. 4 further shows that the corresponding cleaning sponges 6 or 7 can also be connected to the side legs 2, 3 via corresponding rigid connectors 18, if these have a leaf-spring design as in the embodiment shown here.

Figures 5, 6:
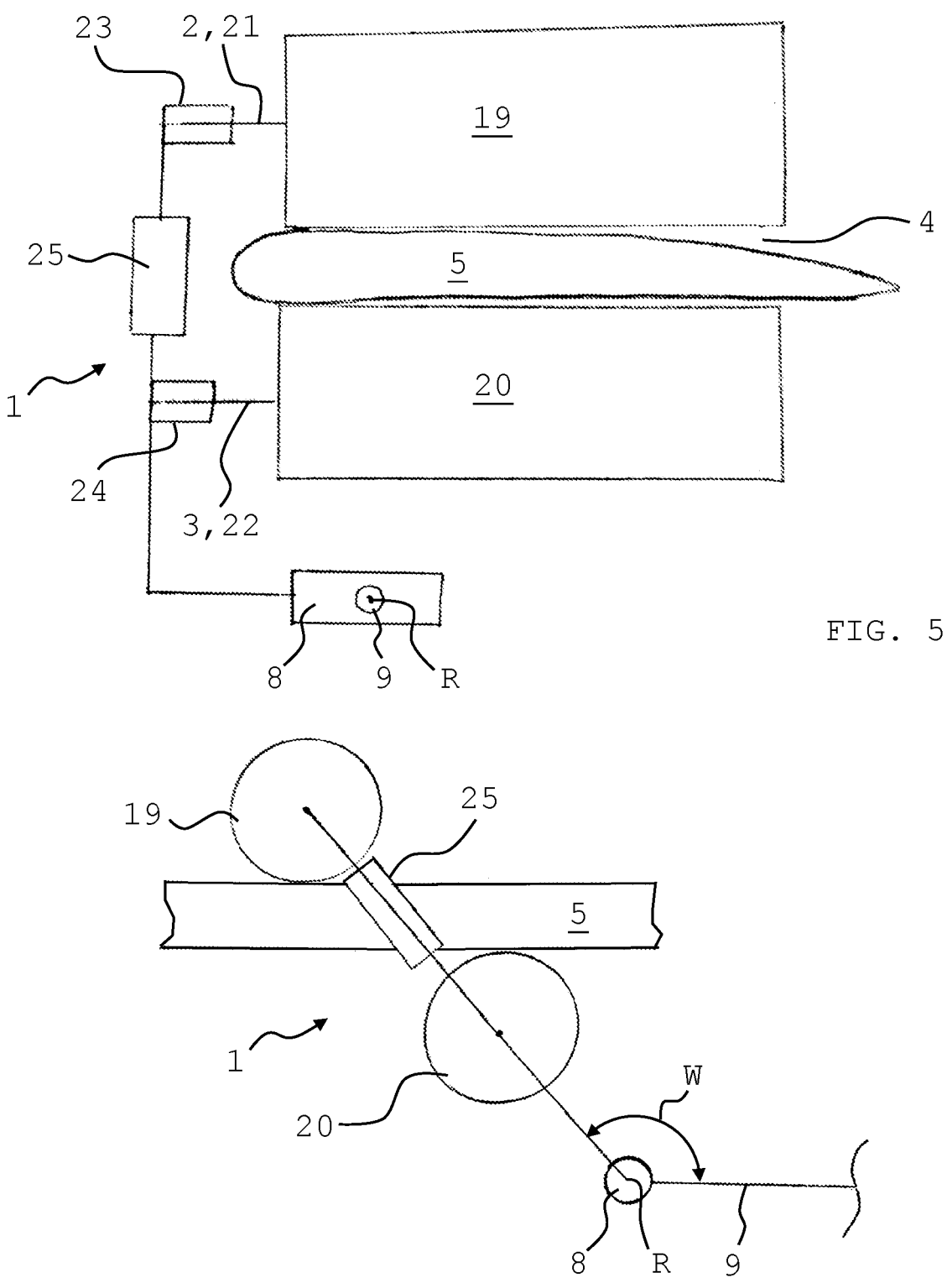
FIG. 5 the schematic sketch of a rotor blade cleaning apparatus with cleaning rollers in front view.
FIG. 6 the schematic sketch of the rotor blade cleaning apparatus according to FIG. 5 in side view.

FIG. 5 shows an embodiment in which the cleaning elements are designed as cleaning rollers 19, 20. These cleaning rollers 19, 20 are mounted via shafts 21, 22 in freewheels 23, 24, via which they are connected to the frame 1. The shafts 21, 22 form the side legs 2, 3 for the opening 4 located between them. The schematically indicated pressure spring 25 allows yielding or tracking of the two cleaning rollers 19, 20 when the thickness of the rotor blade 5 changes.

It is also of relevance in this embodiment that the frame 1 is tiltably connected to the holder 9 via the joint 8 (angle W). Again, as can be seen in FIG. 6, when the handle is moved parallel to the extension of the rotor blade 5 (to the right in the drawing), the frame 1 will tilt about the joint 8 (counterclockwise), pressing the cleaning roller 19 onto the upper side and the cleaning roller 20 onto the lower side of the rotor blade 5. The freewheels 23 and 24, respectively, ensure that the holder 9 can be pushed in the opposite direction (i.e., to the left in FIG. 6) without much effort, with the cleaning rollers 19 and 20 rolling over the surfaces of the rotor blade 5. In doing so, they moisten these surfaces, which leads to a softening of dirt adhering there. When the holder 9 is moved to the right again, the freewheels 23 and 24 lock, respectively, and the cleaning rollers 19 and 20 are moved in this locked state over the previously moistened surfaces of the rotor blade 5, thus cleaning them intensively.

It should be mentioned at this point that in this embodiment a spring preload (not shown) can be generated within the joint 8 and thus a torque can be transmitted from the holder 9 to the frame 1, whereby a resting force is generated when the cleaning rollers 19 and 20 roll over the surfaces of the rotor blade 5 so that the cleaning rollers 19, 20 do not lift off the respective surfaces. The smaller angle W, the greater the resting force. It should also be noted that the advantage of preventing undesired lifting by providing said pretension also exists in all other embodiments.

According to an embodiment not shown, it is also possible in principle to set the two cleaning rollers 19 or 20 in rotation via a drive unit 26, comprising for example a toothed gear or a V-belt or toothed belt drive, in order to achieve active cleaning of surfaces of the rotor blade 5.

Figure 7:
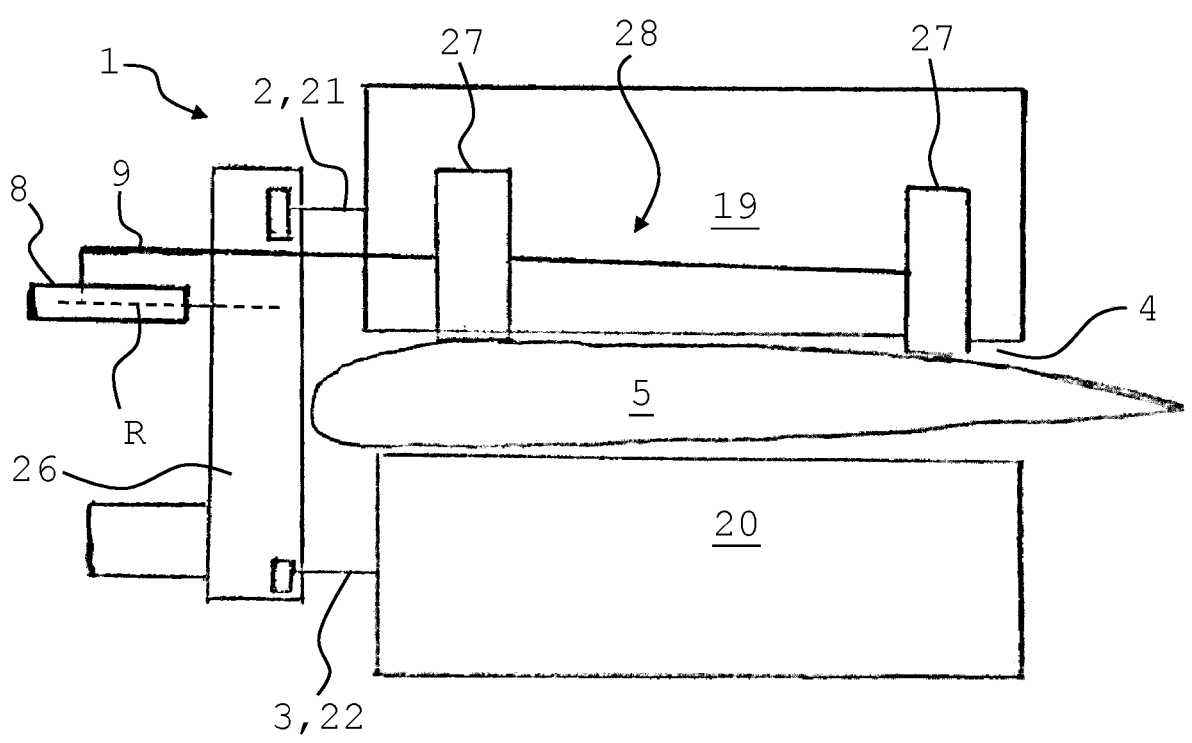
FIG. 7 the schematic sketch of another alternative embodiment of the rotor blade cleaning apparatus in front view.
Figure 8:
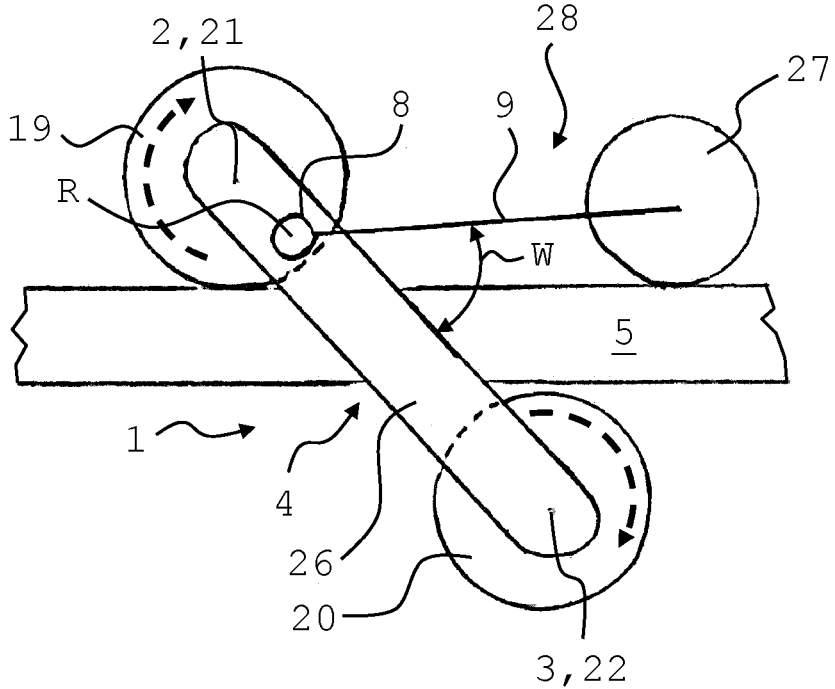
FIG. 8 the schematic sketch of the rotor blade cleaning apparatus according to FIG. 7 in side view.

FIG. 7 and FIG. 8 show a front and side view of an embodiment according to which the apparatus can perform a largely automatic cleaning of the rotor blade 5. Here, the distal end (at the right in FIG. 8) of the holder 9 is supported with low friction on the upper side of the rotor blade 5 by means of a support unit 28 comprising wheels 27. The two cleaning rollers 19, 20 are arranged on the frame 1 and are again located on both sides of the rotor blade 5. By means of a drive unit 26, both cleaning rollers 19, 20 are driven. Preferably, the drive unit 26 is designed so that the cleaning rollers 19, 20 can be driven at different circumferential speeds. Thus, a relative speed is generated which results in a movement of the apparatus along the longitudinal axis of the rotor blade 5. The directions of rotation of both cleaning rollers 19, 20 are identical. For example, if both rollers rotate clockwise (dashed arrows in FIG. 8), the apparatus moves to the left when the upper cleaning roller 19 has a higher circumferential speed than the lower cleaning roller 20 in the contact area with the upper side of the rotor blade 5. This can be achieved by a gearbox of drive unit 26, or by different roller diameters, or by using two separately controllable motors (not shown respectively).

Figure 9:
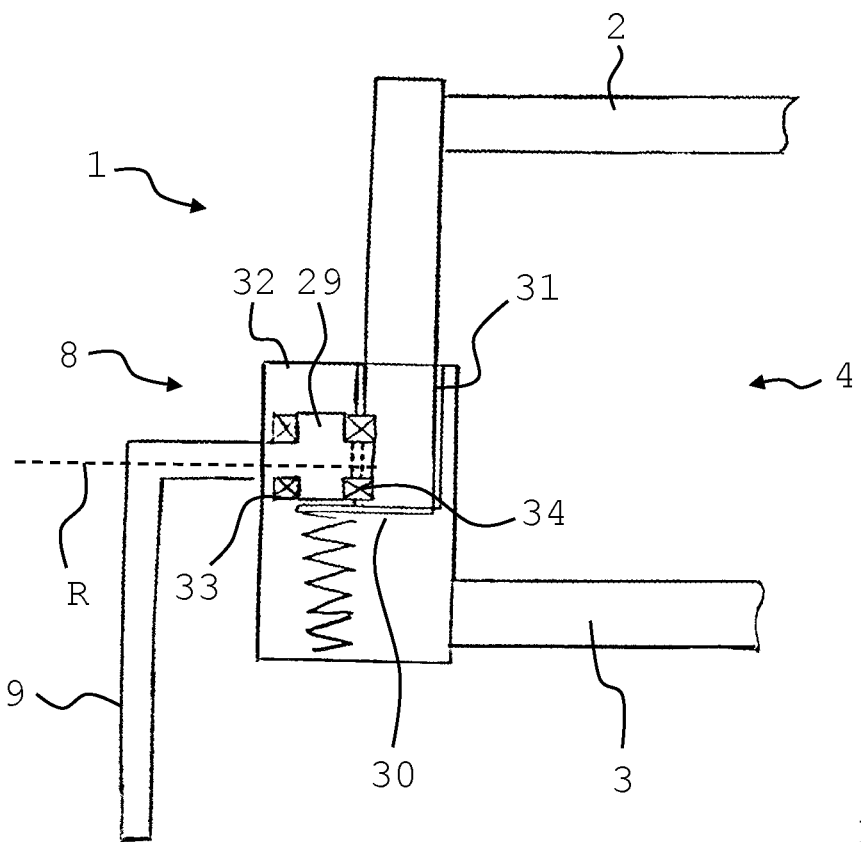
FIG. 9 the schematic sketch of a detail of another alternative rotor blade cleaning apparatus in front view.
Figure 10:
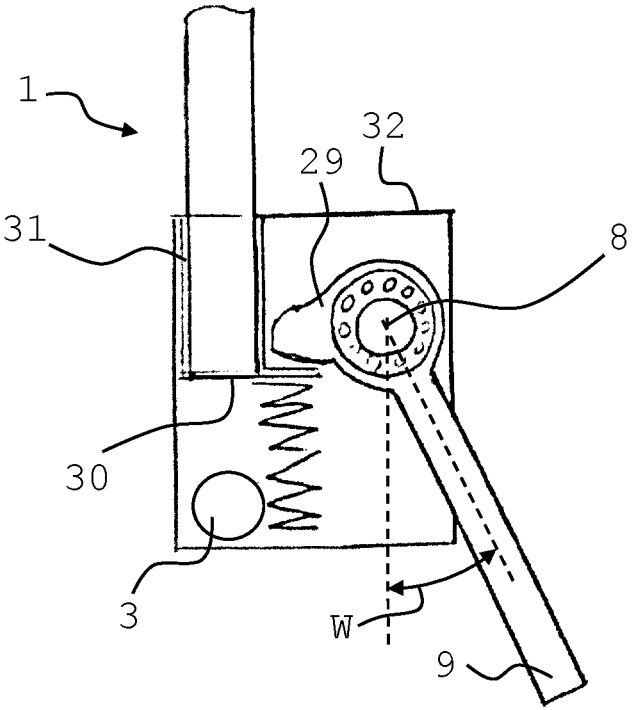
FIG. 10 the schematic sketch of the rotor blade cleaning apparatus according to FIG. 9 in side view.

FIG. 9 and FIG. 10 show an embodiment with variable spacing between the two side legs 2, 3 of the frame 1. FIG. 9 shows the front view looking in the direction of the longitudinal axis of the rotor blade (not shown), FIG. 10 the corresponding side view, where only a relevant section of frame 1 around joint 8 is shown.

The holder 9 therefore leads at the proximal end into a cam 29 accommodated in the housing 32, which can be brought into rotation about the joint 8 by tilting the holder 9 (change of angle W), which in the present case comprises a fixed bearing 33 and a loose bearing 34. If the holder 9 moves with the distal end (bottom right in FIG. 10) upwards, the cam 29 presses more or less far on a catch 30, which in turn is arranged on the displaceable half of the center leg, which runs vertically in the picture and is supported by the friction bearing 31, and pushes it together (the other, fixed half is connected to the housing 32). In order to allow an opposite (resetting) movement in a simple way, the catch 30 works against a spring (no reference sign). In this way, it is possible to easily change the distance between the two side legs 2, 3 so that the opening 4 can be flexibly adapted to rotor blades of different thicknesses.

LIST OF REFERENCE NUMERALS

1 frame
2, 3 side leg
4 opening
5 rotor blade
6, 7 cleaning element, cleaning sponge
8 joint
9 holder
10, 11 flat Spring
12, 13 pivot bearing
14-17 support section
18 rigid connector
19, 20 cleaning element, cleaning roller
21, 22 shaft
23, 24 freewheel
25 pressure spring
26 drive unit
27 wheel
28 support unit (supporting unit)
29 cam
30 catch
31 friction bearing
32 housing
33 fixed bearing
34 loose bearing
R axis of rotation
W tilt angle, angle

What is claimed is:

1. An apparatus for cleaning a rotor blade (5) of an aircraft, comprising:

a frame (1) comprising at least one cleaning element (6, 7; 19, 20) spaced apart from a support element by an opening (4), wherein the frame is configured for accepting the rotor blade (5) for cleaning through the opening (4); and a holder (9) for manually guiding the apparatus against and away from the rotor blade (5) and along the rotor blade (5), wherein one end of the holder (9) is connected to the frame by a joint (8) and an opposing end is free from connection, thereby forming a handle for grasping and for manual operation by the user, wherein the joint (8) provides an axis of rotation for the frame as a whole, wherein the axis of rotation extends in a plane that is perpendicular to a longitudinal axis of the rotor blade (5) and substantially parallel to a surface of the rotor blade (5) when the blade is contacted on opposing sides by the apparatus via the at least one cleaning element (6, 7; 19, 20) and the support element, wherein movement of the handle in a first direction tilts the frame as a whole around the axis of rotation, thereby rotating the at least one cleaning element (6, 7; 19, 20) and support element against the opposing sides of the rotor blade (5) for cleaning, and movement of the handle in an opposing direction removes tilt of the frame as a whole around the axis of rotation, thereby counter rotating the at least one cleaning element (6, 7; 19, 20) and support element away from the opposing sides of the rotor blade (5) to release the rotor blade (5);

wherein the joint comprises a spring or elastic element, wherein the spring or elastic element is biased to apply rotational forces between the at least one cleaning element (6, 7; 19, 20) and support element against the opposing sides of the rotor blade (5).

2. The apparatus, according to claim 1, wherein the joint (8) is arranged for transmission of torques.

3. The apparatus according to claim 1, wherein:

the joint (8) comprises a compression, tension or torsion spring;

or a compression, tension or torsion spring is arranged between the frame (1) and the holder (9);

or the joint (8) contains at least one end stop, which limits tilting.

4. The apparatus according to claim 1, wherein the at least one cleaning element comprises a cleaning roller (19, 20).

5. The apparatus according to claim 4, wherein the cleaning roller (19, 20) is mounted on the frame (1) by means of a freewheel (23, 24) that locks in a rotation direction, and/or is driven by a drive unit (26).

6. The apparatus according to claim 1, wherein the at least one cleaning element comprises a cleaning sponge (6, 7).

7. The apparatus according to claim 6, wherein a side region (2, 3) of the frame (1) is equipped with the cleaning sponge (6, 7).

8. The apparatus according to claim 1, wherein the at least one cleaning element comprises a gel pad.

9. The apparatus according to claim 1, wherein the at least one cleaning element (6, 7; 19, 20) is supplied via a liquid supply with a cleaning liquid.

10. The apparatus according to claim 1, characterized in that a distance between two side regions can be controlled by means of the holder (9).

11. The apparatus according to claim 4 having two cleaning rollers (19, 20) or with one cleaning roller (19; 20) and a roller-shaped support element, characterized in that at a distal end of the holder (9) a support unit (28) is provided, wherein the cleaning rollers (19, 20) or the one cleaning roller (19; 20) and the roller-shaped support element can be driven by means of a drive unit (26) and/or are constructed in a way such that the apparatus can be moved in a direction.

* * * * *